Feb. 13, 1968  H. MUELLER  3,368,244
WAX INJECTION PRESS
Filed April 4, 1966  7 Sheets-Sheet 5
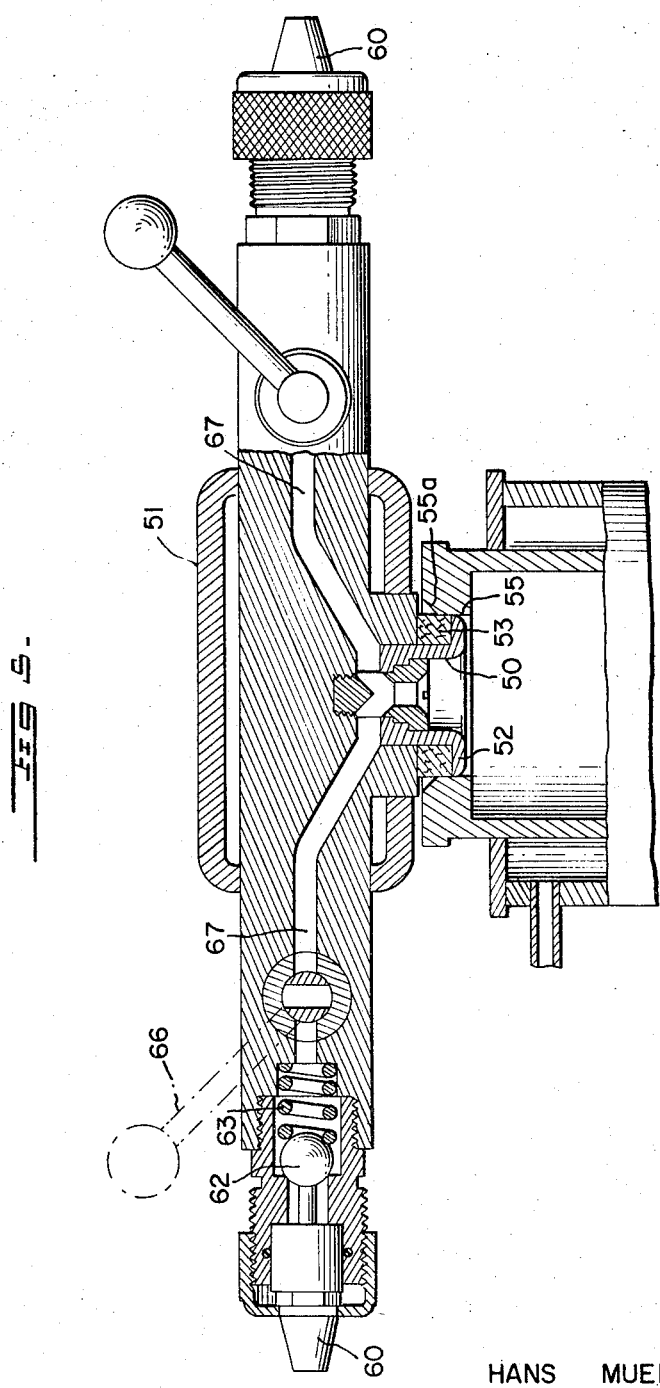
INVENTOR
HANS MUELLER
BY Ralph L. Bassett
ATTORNEY Feb. 13, 1968 H. MUELLER 3,368,244
WAX INJECTION PRESS
Filed April 4, 1966 7 Sheets-Sheet 6
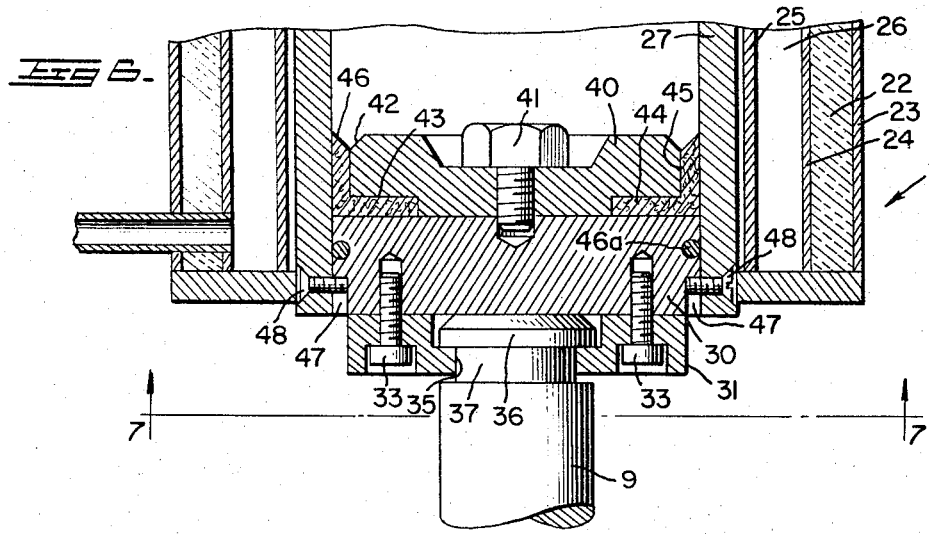
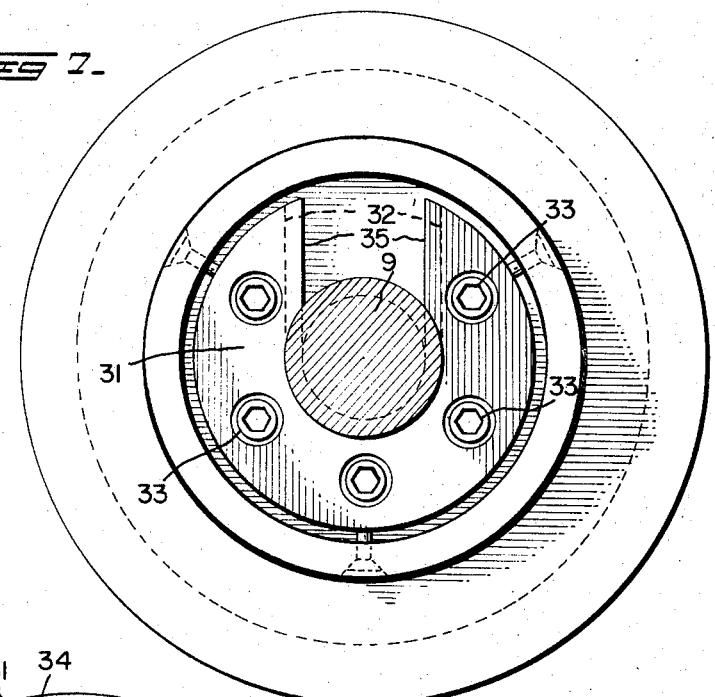
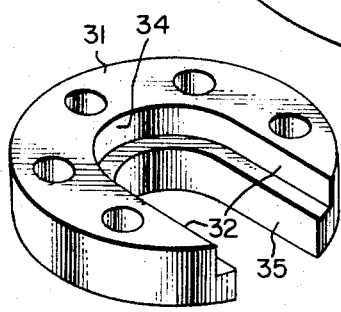
INVENTOR
HANS MUELLER
BY Ralph T. Bassett
ATTORNEY

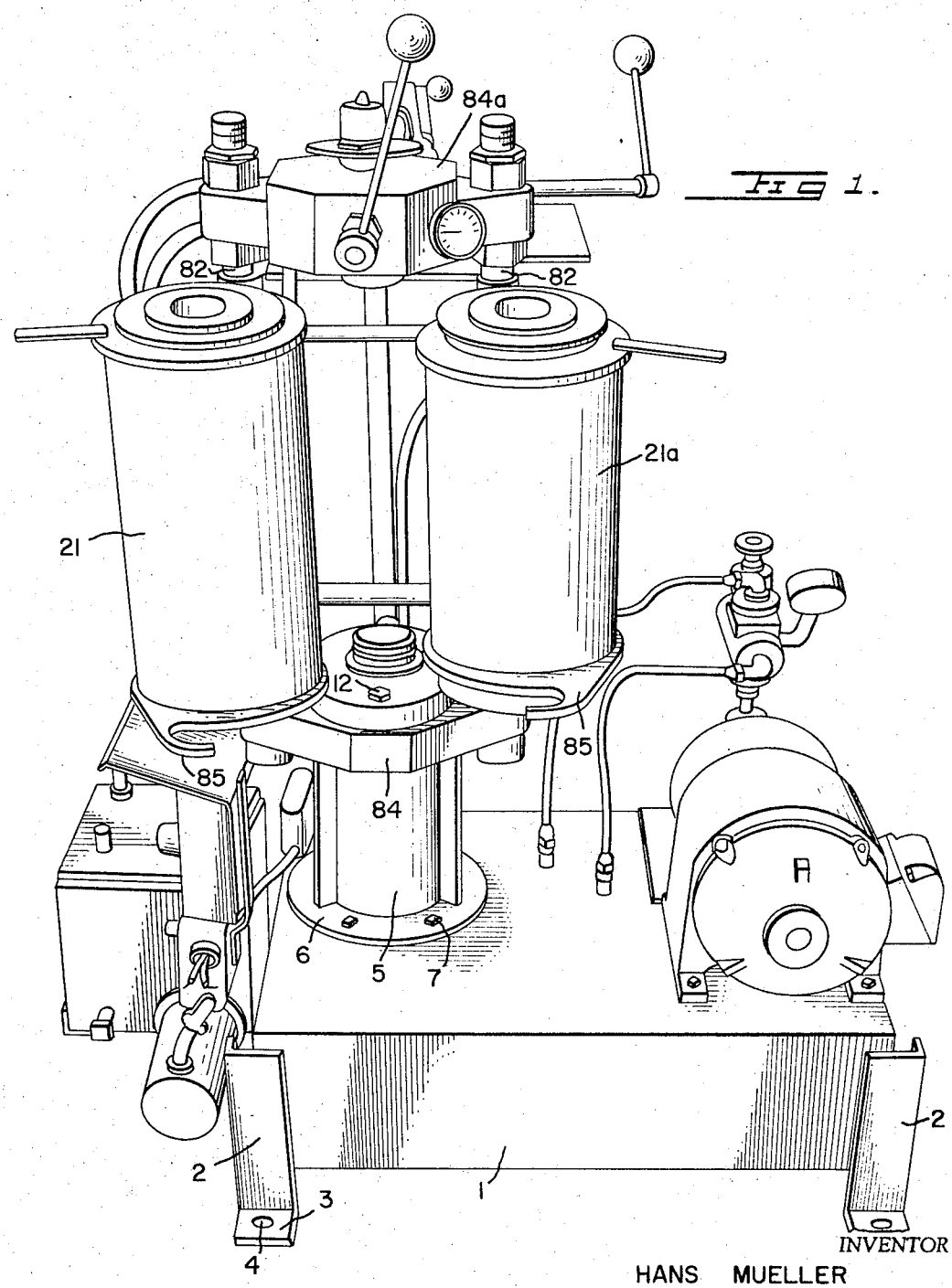

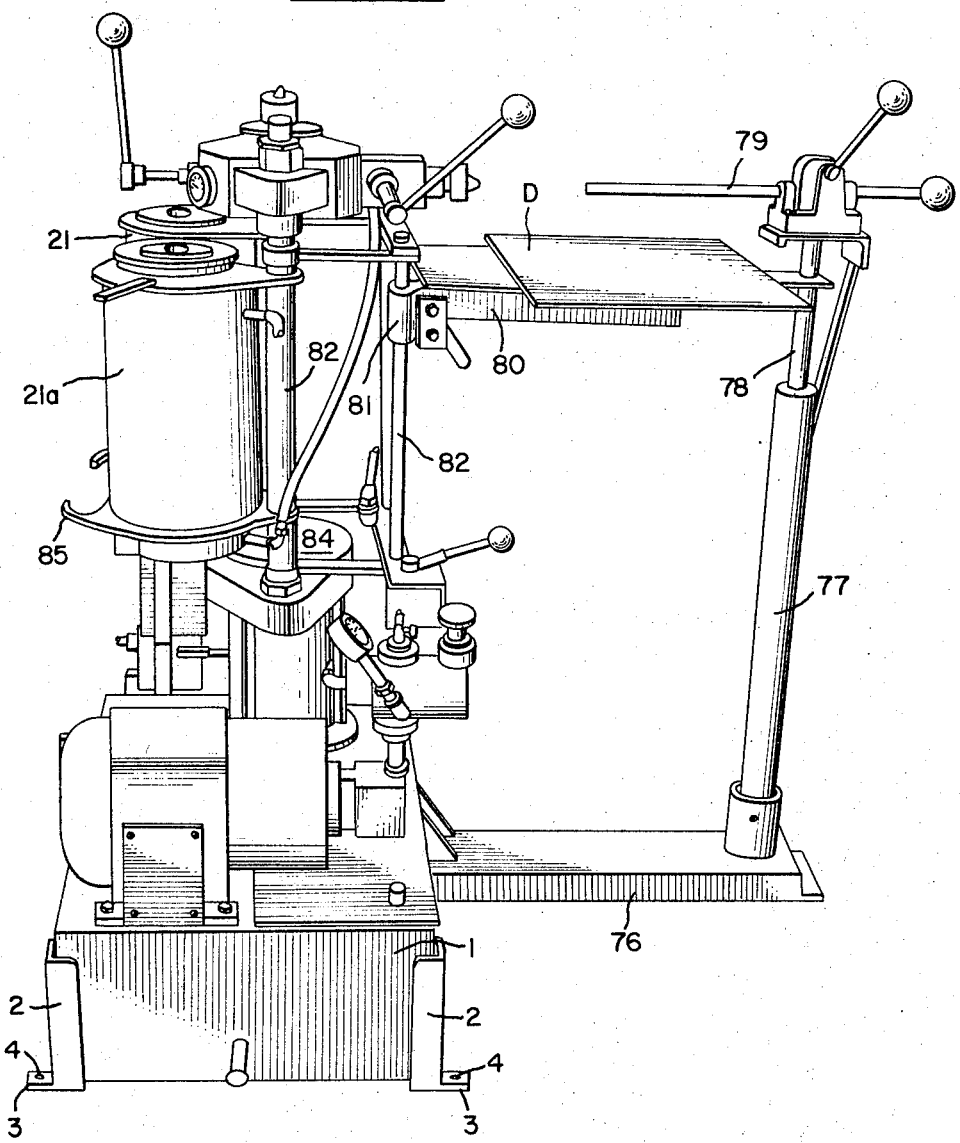

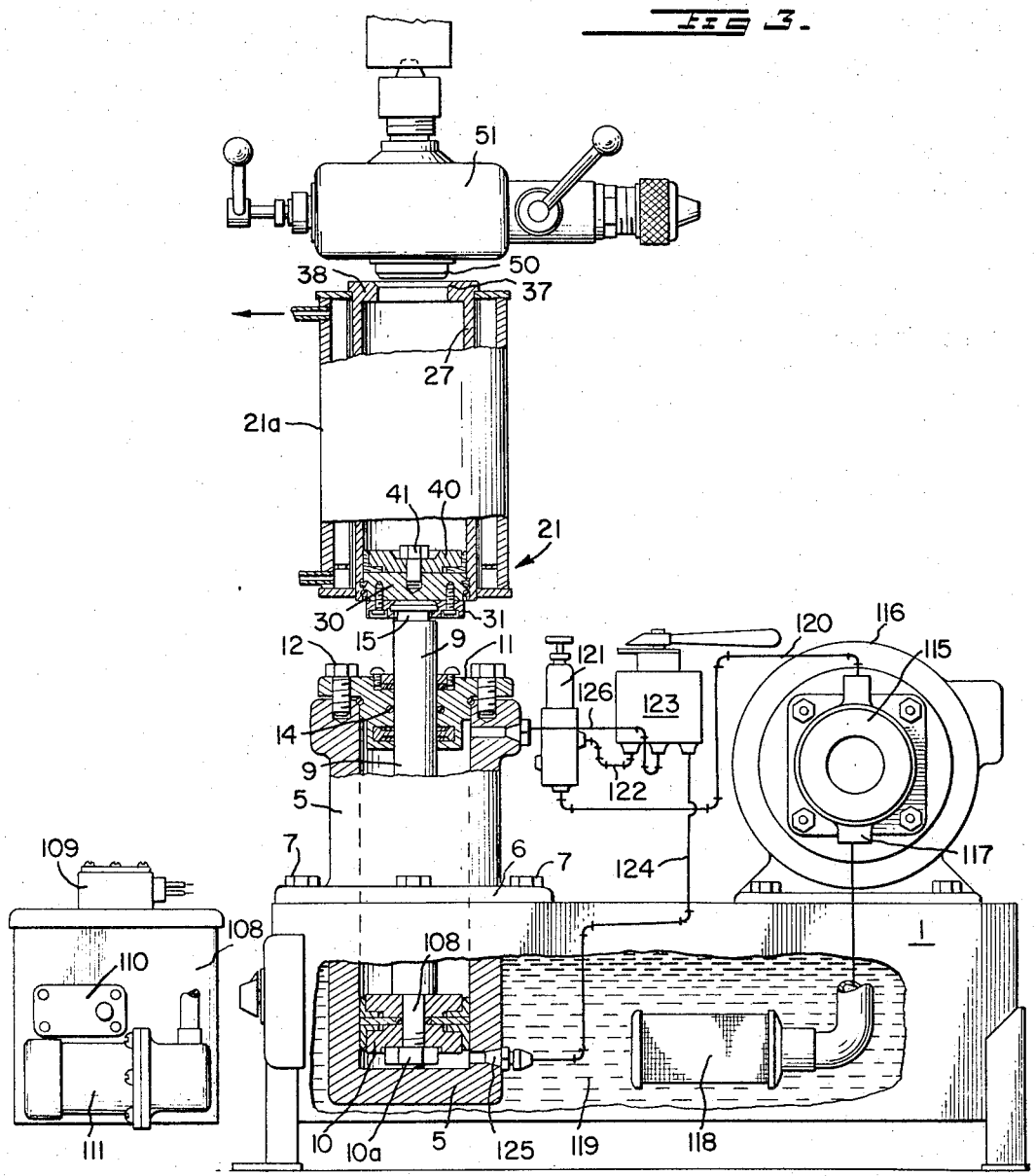

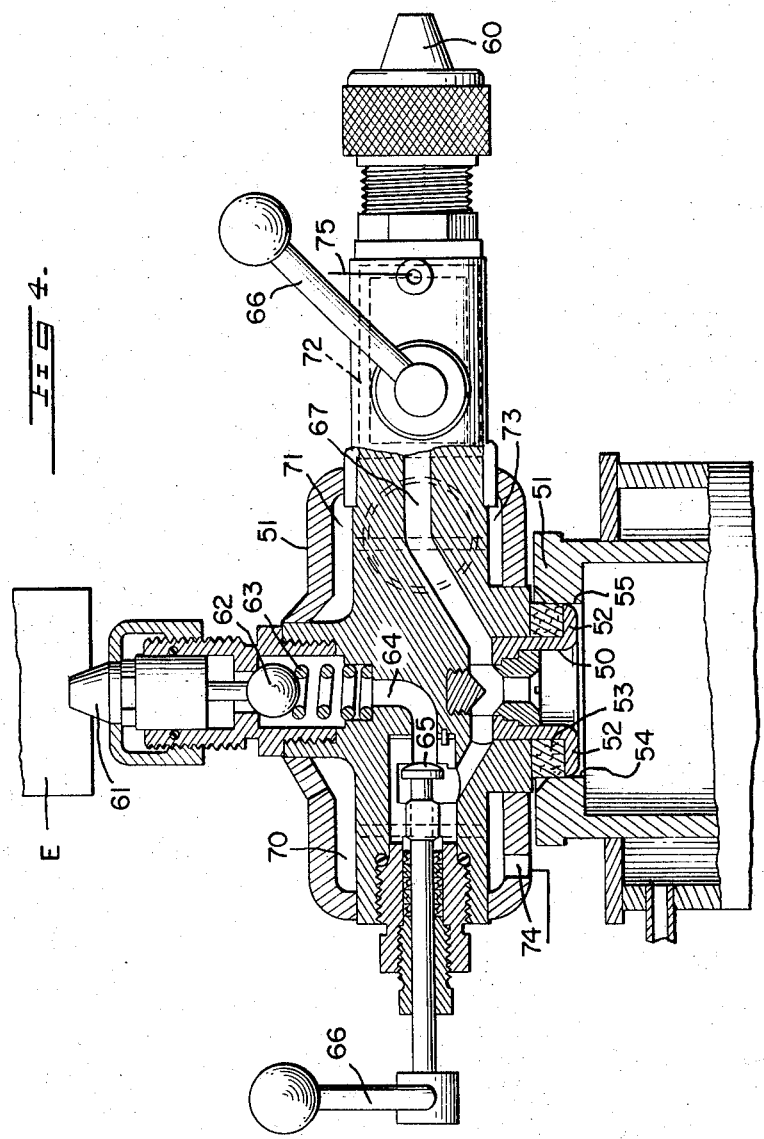

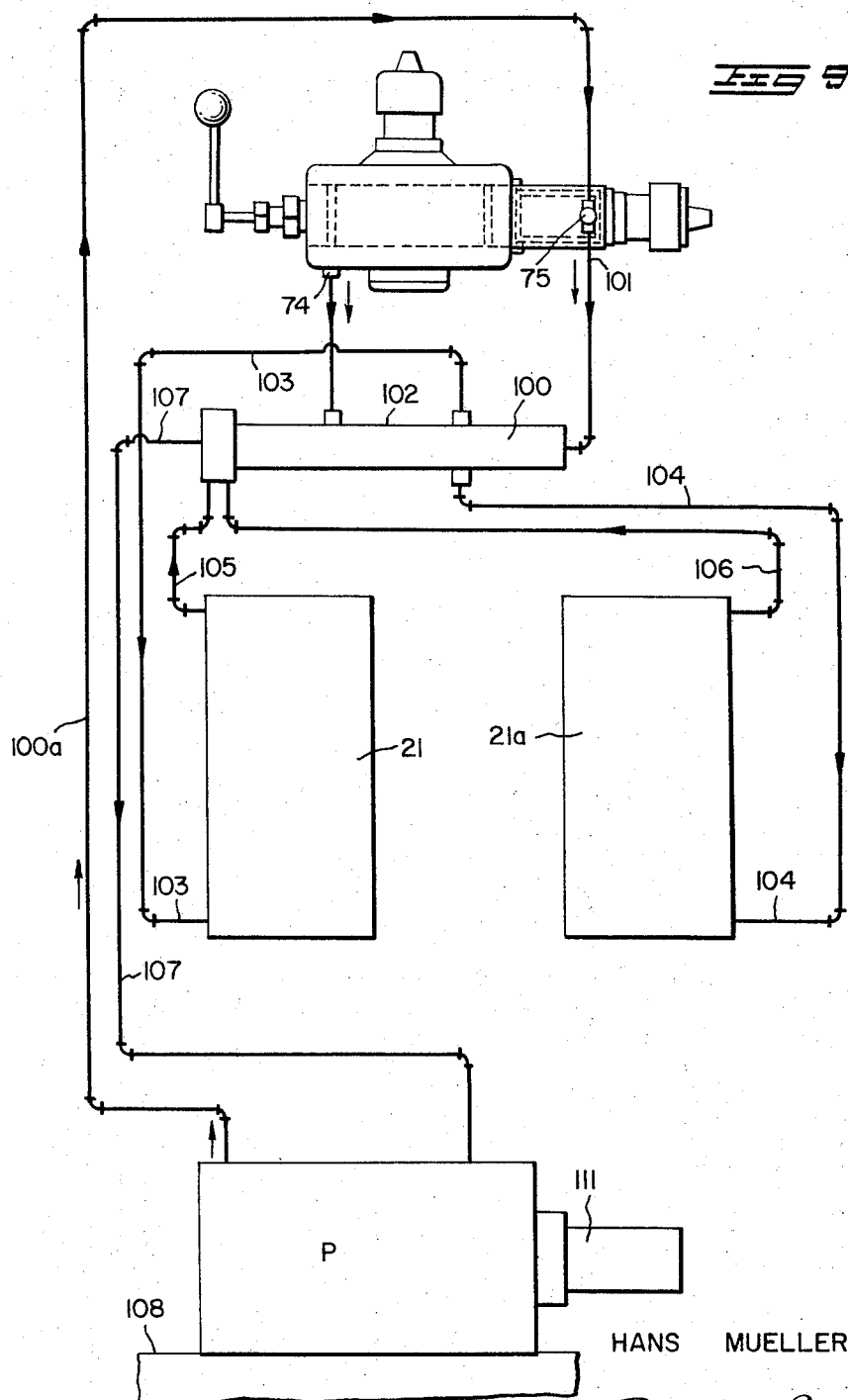

United States Patent Office 3,368,244
Patented Feb. 13, 1968

3,368,244
WAX INJECTION PRESS
Hans Mueller, South Road, Poughkeepsie, N.Y. 12601
Filed Apr. 4, 1966, Ser. No. 540,032
11 Claims. (Cl. 18—30)

This invention relates to a wax injection press and particularly to wax injection presses of the type for use in loss wax processes utilized in connection with precision investment castings.

More specifically, the present invention comprehends an injection press having automatic injection valves capable of association with either horizontal or vertical press heads, the injection valves being mounted for control of wax to a selected die, the wax being delivered from a wax cylinder and being maintained in a slushy form at all times in thew ax cylinder and throughout the ports to the press heads, whereby chilling of the finished wax form is avoided and increased speed and more accurate control of both the operation of the press and of the product is accomplished.

One of the main objects of the invention is the provision of a new loss wax process involving the concept of maintaining and injecting wax into a die with the wax being controlled and maintained in a slushy semi-solid state, as distinguished from a readily flowable fluid state, whereby the wax is capable of injection but after injection into the die does not require an extended chilling period so that the wax forms from the die may be immediately available for handling without loss of time and without loss of the wax forms normally occurring where the injected wax is in a highly fluid, and therefore, in a high temperature condition requiring critical timing for chilling to a stable state.

A further object of the instant invention is the provision of an injection press having controlled pressure for continuously actuating a hydraulic cylinder for the delivery of slushy wax to either horizontal or vertical dies and wherein means are provided and automatically controlled for maintaining constant temperatures throughout the several parts of the assembly including the wax cylinder, by-passes, valving and injection valves.

These and other objects of the invention will more clearly hereinafter appear by reference to the accompanying drawings forming a part of the instant specification and wherein like characters of reference designate corresponding parts throughout the several views, in which:

FIG. 1 is a front elevation of an apparatus comprising the present invention;

FIG. 2 is a side elevation of the disclosure of FIG. 1;

FIG. 3 is a view, partly in section, of the hydraulic cylinder and wax cylinder assembly;

FIG. 4 is an enlarged vertical sectional view of an injection head connected with the wax cylinder;

FIG. 5 is a view similar to FIG. 4 with a modified form of injection head;

FIG. 6 is an enlarged fragmentary section of the base of the wax cylinder and plunger head;

FIG. 7 is a section on line 7—7 of FIG. 6;

FIG. 8 is a perspective view of the clamp ring; and

FIG. 9 is a diagrammatic view showing the flow of heating oil throughout the assembly.

Referring to FIG. 1, a hydraulic oil reservoir is shown at 1 in the form of a rectangular container with corner brackets 2 having lateral extensions 3 provided with bolt openings 4 for securing the structure in fixed position. Mounted on the top and extending into the hydraulic oil reservoir 1 is the vertically positioned closed end hydraulic cylinder 5 provided with an annular radial flange 6 which seats on the top of reservoir 1 and is secured in position by the bolts 7. The flange 6 supports the hydraulic cylinder 5 within the reservoir 1 with the bottom of the cylinder spaced from the bottom of the reservoir. Within the hydraulic cylinder 5 (see FIG. 3) is the piston rod 9 on the bottom portion of which is mounted the piston 10 shown in its lowermost position within the cylinder. The piston 10 is secured to the rod 9 by the nut 10a threaded on the rod extension 10b as shown. The cylinder 5 includes the end cover 11 through which the piston rod 9 extends, the end cover 11 being secured on the open end of the cylinder 5 by the bolts 12 and including appropriate packing comprising O-ring 14 and wiper ring 15.

Adapted to be positioned in axial alignment with the piston rod 9 is a holding drum assembly including a wax cylinder, the structure of which is best illustrated in FIG. 6. The wax cylinder is positioned in an insulated wall structure defining a holding drum and including an insulated wall 22 confined between an outer cylinder 23 and the inner cylinder 24. The wall of the inner cylinder 24 is spaced from the inner wall 25 of the holding drum to define therebetween an annular hot oil chamber 26 for the flow of hot oil for maintaining the structure at a predetermined selected temperature. Spaced inwardly from the inner wall 25 of the holding drum assembly is a cylindrical wall structure 27 which is spaced slightly from the cylindrical wall 25 to facilitate slight vertical relative sliding movement of the inner chamber wall 27 within the holding drum. The wall 27 which defines the wax chamber is closed at its lower end by a piston assembly comprising a cylinder block 30 to the bottom of which is fixed the horseshoe clamp ring 31 having an access opening defined by the walls 32. The horseshoe clamp ring 31 is secured to the bottom of block 30 by a plurality of bolts 33 with its lateral opening 32 positioned in a predetermined position for a purpose to be more fully hereinafter described.

The access opening 32 in the horseshoe clamp ring 31 is provided with a lower inwardly projecting flange 35, the flange being continuous throughout the access opening and the latter being contoured and dimensioned to receive the annular enlarged head portion 36 of the piston rod 9, which latter is defined by the annular recess 37 about which the projecting flange 35 is adapted to be positioned. By this construction the head 36 of the piston rod 9 can be swung through the access opening 32 to a position aligning the axis of the cylinder block 30 with the axis of the piston rod 9 so that the cylinder block will be free to travel with the piston rod upon the application of pressure within the cylinder 5.

The upper end of the cylinder block 30 is provided with a clamp cap 40 of annular form which is provided with a central bolt opening which is aligned with a central bolt opening in the block 30 to permit the parts to be clamped together by the bolt 41. The outer upper peripheral edge 42 of the cap 40 is beveled and the lower marginal edge 43 is recessed to receive the bottom annular flange 44 of a cup washer, the latter having an upwardly extending annular portion 45 which seats between the outer face of the cap 40 and the inner wall of chamber 27. The upper inner face of the washer extension 45 is beveled as at 46, the bevels being aligned and associated with the bevel 42 of the cap 40 to provide an annular V-shaped chamber against which pressure is applied by material in the cylinder when the piston is moved by pressure in the hydraulic cylinder 5. A series of slots 47 extend longitudinally of the outer bottom face of the lower portion of the block 30 and stop pins or screws 48 extend through the wall 27 into the slots 47 to prevent the piston assembly from escaping out of the wax chamber.

By this construction the piston assembly associated with the block 30 forms a closure for the bottom of the wax cylinder 27 and will normally be contained in and form the closure for the bottom of the wax cylinder 27. When the lateral opening 32 registers with the head of the piston rod 9 and the head of the piston rod is attached to the piston, the piston assembly will be free to travel vertically within the wax chamber 27. Upon initial vertical movement of the piston rod 9, when the chamber 27 is in loaded condition with the wax in a slushy state, there is sufficient friciton between the piston assembly, including the cup washer 46, the packing ring 46a and the slushy wax to bind the piston assembly and the cylinder 27 to cause the latter to be moved upward within its insulated housing a sufficient distance for engaging and seating at its upper end against the annular depending seat 50 of the control head 51, as best shown in FIGS. 4 and 5. The depending seat 50 of the control head 51 includes a laterally projecting shoulder 52 which defines a recess for holding a packing ring 53, as clearly shown. The packing ring 53 of the depending seat is adapted to snugly fit within an opening 54 at the upper end 55 of the sliding wax cylinder 27 contained in the wax drum assembly. It will be noted that the annular opening 54 in the upper end structure of the wax cylinder is defined in part by a beveled upper inner peripheral portion 55a to facilitate the cooperation of the associated parts.

The control head 51, shown in FIGS. 4 and 5, is constructed to provide for the use of either horizontal injection nozzles 60 or vertical injection nozzles 61, the horizontal nozzles generally being associated with manual manipulation of dies from a platform or table such as D shown in FIG. 2, while the vertical injection nozzles 61 can be associated with a vertically moving die, such as shown in FIG. 4 at E. The nozzles 61, upon contact at pressure, opening a ball valve 62 against a spring 63 for communication with a suitable port 64 which can be controlled by a manual valve 65 through an actuating handle 66. The same arrangement of elements is provided for the horizontal injection nozzles 60 which will communicate with a passage 67 to the wax in the wax cylinder which is under pressure from the hydraulic pressure chamber 5.

The entire nozzle head, including the nozzles, is provided with encompassing heating chambers as indicated at 70, 71, 72 and 73, the heating chambers providing for a continuous flow of heating fluid from a pressure source, as will be more fully hereinafter described, which can be connected at an inlet port 74 and flows through the heating chambers encompassing the structure and out of the ports 75.

Referring again to FIGS. 1 and 2 it will be noted that the assembly comprehends the utilization of at least two wax cylinders 21 and 21a, both of which are adapted to contain slushy wax and to have the wax therein normally maintained in its slushy state by a flow of heating fluid such as oil from a suitable source and in constant circulation, as will be more clearly hereinafter described in connection with the diagrammatic disclosure of FIG. 9. Both of the wax cylinders are fitted with piston head assemblies, such as shown in FIG. 6, which normally form a closure for the bottoms of the wax cylinders and which in each instance can be swung on its supporting structure to a position wherein the piston assembly is connected with the piston rod to the hydraulic pump for the application of pressure, it being remembered that the initial pressure to the piston causes the inner wax cylinder 27 to shift slightly vertically to cause a mating at the upper end of the cylinder with the depending seat 50 of the control head 51, as shown in FIGS. 4 and 5. The nature of the connection between the piston assembly 30 and the piston rod permits a quick interchange of the wax drums when the wax in one cylinder has been completely discharged and a new cylinder of slushy wax is to be substituted. The interchange of wax drums by the means disclosed making the operation quick and accurate and maintaining the piston rod, wax drums, wax cylinders and wax heads all in axial alignment. The drums are provided with hooks shown at 85 which are positioned at each side of each wax drum base, these hooks cooperating with the upright braces 82 to position the drums and secure them against displacement.

As best seen by an examination of FIGS. 1 and 2, the assembly, including the invention, is mounted mainly on the hydraulic oil reservoir 1, there being horizontal extension 76 supporting the post 77 terminating at its upper end in the adjustable telescoping section 78 upon which is mounted the platform or table D which adjustably supports for manipulation the dies to be associated with the horizontal nozzles 60. The upper end of the adjustable section 78 mounts the manipulation tools 79 for securing the dies against the nozzles. The table or platform D is further supported by the shelf 80 adjustably supported at 81 on the upright braces 82. The pair of posts 82 extend between the head 84 and the nozzle head 84a and these posts are positioned so that the hooks 85 can be rotated with the wax cylinder holding drum to engage the same to stabilize the drums during the operation of the hydraulic piston.

Referring particularly to FIG. 9, the distribution of hot oil from pump P is illustrated diagrammatically with the oil delivered under pressure through line 100 to the hollow shell of the press head defined in part as indicated by reference characters 70, 71, 72 and 73 at inlet 75 (see FIG. 4). A pair of discharge lines 74 and 101 deliver the oil from the press head 57 to the distributing header 102 where it is discharged through pipes 103 and 104 to the base portion of the annular wax heating chambers formed about the pair of wax cylinder holding drums. The heated oil flowing through the heating chambers of the wax cylinder holding drums is discharged through the outlet pipes 105 and 106 to the header section 100 from which it is discharged through pipes 107 to the reservoir 108. As seen from FIG. 3, the oil heating reservoir 108 is provided with a heater indicated at 109, a thermostat control 110 and a pump 111, the latter feeding the heating oil to the line 100a.

The fluid for actuating the piston 10 in the hydraulic cylinder 5 is supplied from a pump 115 driven by a motor 116, the pump having an intake 117 opening through strainer 118 in the oil supply 119 in oil reservoir 1. The outlet 120 of the pump 115 discharges through the pressure regulator 121 through line 122 to pass through reverse control valve 123 which controls flow through passageway 124 in the hydraulic cylinder intake 125 below the piston 10 in the hydraulic cylinder. A passageway 126 is provided at the upper end of the hydraulic cylinder to provide for the return of escaping hydraulic fluid to the line, and the piston is returned to the lower end of the cylinder by changing the position of the reverse control valve.

It is important that the wax in the cylinder under pressure from the hydraulic piston be in a slushy state and not in a fluid state, there being two primary reasons why the condition of the wax is important. In the first place, wax placed in the wax cylinders in a slushy state eliminates the accumulation of air bubbles and in the second instance, the wax form when made from slushy wax does not take a material amount of chilling and the forms can be instantly removed and handled without injury. In the present illustration two wax cylinders are provided, both cylinders being connected to a common source of heat and maintained with the wax in a slushy state from a thermostatically controlled heating source. More than two cylinders can be provided where the injection process involves relatively large forms and the use of a substantial amount of wax. Regardless of the number of war cylinders they will all be connected to and subjected to the same heat from a common heating source.

The wax cylinder 27 is contained in the holding drum and has a slight sliding or floating association with the holding drum so that the initial vertical movement of the hydraulic piston in the cylinder 5 will cause a shifting or slight vertical movement of the wax cylinder in the neighborhood of 1/16" to facilitate the sealing connection between the cylinder and the head. When the wax cylinder and head have been properly seated, the piston will continue its movement to apply appropriate predetermined pressure to the wax and through the head to the mold. When the wax in the wax cylinder has been dispensed, the hydraulic piston is reversed until the piston is at the bottom of the hydraulic cylinder. Obviously the wax cylinder will be removed vertically from the holding drum as teh stop screws at the bottom of the cylinder prevent removal in a downward direction.

What is claimed is:

1. In a wax injection apparatus, a hydraulic oil reservoir and anchoring means therefor, a hydraulic cylinder mounted on the reservoir and having its base portion extending into said reservoir, a piston in said hydraulic cylinder, a pump for pumping fluid under pressure from the hydraulic oil reservoir into said hydraulic cylinder, means for controlling the flow and pressure of the fluid from said pump to said hydraulic cylinder, a piston rod connected to said piston and extending vertically upward from said hydraulic cylinder, a vertical wax cylinder having a closing at its upper end with a central passageway therethrough, a piston structure forming a bottom closure for said wax cylinder, means for limiting the downward movement of said piston structure, sealing means between the piston structure and the wax cylinder, mans for detachably connecting the piston structure in the wax cylinder to the upper end of the piston rod in said hydraulic cylinder, a heating drum enclosing said wax cylinder, means providing friction between the piston in said wax cylinder and the wall of the wax cylinder to permit movement of said wax cylinder with said piston upon initial movement of the latter, a press head having controlled nozzles for association with dies, said press head having a depending portion providing a passageway therethrough to said nozzles and including a depending seat adapted for alignment with the central passageway in said wax cylinder closure, whereby vertical movement of said wax cylinder upon initial movement of the hydraulic piston will cause a sealed seating of the press head with said wax cylinder, heating means for said heating drum and said press head, and means for feeding heating fluid to the heating means for retaining the wax in said wax cylinder in a predetermined slushy state.

2. The structure of claim 1 characterized in that the press head and the wax cylinder are enclosed in housings for the circulation of heating fluid and the heating fluid is supplied under pressure from a source including a thermostatically controlled heater.

3. The structure of claim 1 characterized in that the piston structure forming the bottom closure for the wax cylinder is provided with a detachable connection for locking engagement with the upper end portion of the piston rod connected to the piston in the hydraulic cylinder.

4. The structure of claim 3 characterized in that the detachable connection between the piston structure and the upper end of the piston rod includes a clamp member of horseshoe form fixed to the bottom of the piston structure, the clamp member being provided with a bottom flange which engages about the neck defining an enlarged head at the upper end of the piston rod.

5. The structure of claim 1 characterized in that upright braces are provided for supporting the assembly and the heating drum enclosing the wax cylinder is provided with a pair of diametrically opposed horizontal hook members which are adapted to engage the upright braces for positioning the parts.

6. The structure of claim 1 characterized in that the piston structure forming a bottom closure for the wax cylinder includes a central block member, a removable packing at its upper end and a detachable coupling member at its bottom portion for association with the upper portion of the piston rod connected to the piston in the hydraulic cylinder.

7. The structure of claim 1 characterized in that the wax cylinder is slidably mounted in the heating drum, whereby the wax cylinder may be moved by the hydraulic piston for engagement with the press head independently of the heating drum.

8. In combination with a wax injection apparatus comprising a hydraulic oil reservoir, a hydraulic cylinder associated with the reservoir, a piston in said hydraulic cylinder, a pump for pumping fluid under pressure from the hydraulic oil reservoir into the hydraulic cylinder for controlling the movement of the piston, a piston rod connected to the piston and extending vertically upward from the hydraulic cylinder, said piston rod including a coupling element at its upper extremity, a plurality of wax cylinders, each of said wax cylinders having a central passageway at its upper end and a bottom closure in the form of a sliding piston and including a coupling element for detachable association with the coupling element at the upper extremity of the piston rod, heating drums enclosing each of said wax cylinders, a press head having controlled nozzles for association with dies, said press head having a depending portion providing a passageway therethrough to said nozzles and including a depending seat adapted for alignment with the central passageway in one of said wax cylinders, means for supplying heated fluid to all of said heating drums and to said press head, and valve means for controlling the flow of oil under pressure from said hydraulic reservoir to said hydraulic cylinder for moving the piston closure of an associated wax cylinder upwardly to force wax through the central passageway into said press head.

9. The structure of claim 8 characterized in that means are provided for locking the wax cylinder into position in vertical alignment with the piston in the hydraulic cylinder.

10. The structure of claim 8 characterized in that means are provided for limiting the outward movement of the closure piston in its wax cylinder to prevent its displacement from the cylinder.

11. The structure of claim 8 characterized in that means are provided for binding the sliding piston and the wax cylinder during the initial movement of the piston to lift the wax cylinder into engagement with the press head.

References Cited

UNITED STATES PATENTS

| 2,434,557 | 1/1948 | Fox et al. | 18—30 |
| 2,461,723 | 2/1949 | Cowan | 18—30 |
| 2,602,189 | 7/1952 | Finelt | 18—30 |
| 2,752,653 | 7/1956 | Emblem et al. | 164—45 |
| 3,141,915 | 7/1964 | Nieuwenhuis et al. | 164—45 X |

WILBUR L. McBAY, *Primary Examiner.*